(12) United States Patent
Ragnetti et al.

(10) Patent No.: US 7,968,175 B2
(45) Date of Patent: *Jun. 28, 2011

(54) RADIATION CURABLE PRINTING MEDIA, TRANSFERS PRODUCED THEREWITH AND PROCESS FOR THE PRODUCTION OF CERAMIC DECORATION

(75) Inventors: Maurizio Ragnetti, Mainz-Kostheim (DE); Frank Walter, Rüsselsheim (DE)

(73) Assignee: Ferro GmbH, Frankfurt (DE)

( * ) Notice: Subject to any disclaimer, the term of this patent is extended or adjusted under 35 U.S.C. 154(b) by 1265 days.

This patent is subject to a terminal disclaimer.

(21) Appl. No.: 10/546,676

(22) PCT Filed: Jan. 29, 2004

(86) PCT No.: PCT/EP2004/000800
§ 371 (c)(1), (2), (4) Date: Jan. 9, 2006

(87) PCT Pub. No.: WO2004/076569
PCT Pub. Date: Sep. 10, 2004

(65) Prior Publication Data
US 2006/0134554 A1    Jun. 22, 2006

(30) Foreign Application Priority Data
Feb. 28, 2003    (DE) .................... 103 08 971

(51) Int. Cl.
*B32B 5/16* (2006.01)
(52) U.S. Cl. .................... 428/207; 428/195.1; 428/352; 428/414; 428/500; 428/913; 428/914
(58) Field of Classification Search ............... 428/195.1, 428/207, 352, 414, 500, 913, 914
See application file for complete search history.

(56) References Cited

U.S. PATENT DOCUMENTS

| | | | |
|---|---|---|---|
| 4,091,122 A | 5/1978 | Davis et al. | |
| 4,666,756 A | 5/1987 | Sakata et al. | |
| 4,704,310 A | 11/1987 | Tighe et al. | |
| 5,219,641 A | 6/1993 | Mehta et al. | |
| 5,264,271 A | 11/1993 | Satake et al. | |
| 5,319,060 A | 6/1994 | Nishikawa et al. | |
| 5,432,258 A * | 7/1995 | Yoshimura | 428/32.79 |
| 5,534,905 A | 7/1996 | Takahashi et al. | |
| 5,558,911 A | 9/1996 | Blum | |
| 5,608,441 A | 3/1997 | Takahashi et al. | |
| 5,629,359 A * | 5/1997 | Peeters et al. | 522/96 |
| 5,700,891 A | 12/1997 | Huver et al. | |
| 5,968,606 A | 10/1999 | Osuna et al. | |
| 6,114,404 A | 9/2000 | Deeken et al. | |
| 6,204,303 B1 | 3/2001 | Osuna et al. | |
| 6,354,700 B1 | 3/2002 | Roth | |
| 6,372,854 B1 * | 4/2002 | Sunaga et al. | 525/326.8 |
| 6,476,840 B1 | 11/2002 | Taylor et al. | |
| 6,635,142 B1 | 10/2003 | Stula et al. | |
| 6,755,519 B2 | 6/2004 | Gelbart et al. | |
| 6,780,512 B2 | 8/2004 | Macedo | |
| 6,815,468 B2 | 11/2004 | Nixon et al. | |
| 6,844,116 B2 | 1/2005 | Takada et al. | |
| 6,850,263 B2 | 2/2005 | Taylor et al. | |
| 6,853,394 B2 | 2/2005 | Taylor et al. | |
| 6,872,441 B2 | 3/2005 | Baumann et al. | |
| 6,909,444 B2 | 6/2005 | Ishida et al. | |
| 2002/0098326 A1 * | 7/2002 | Sato et al. | 428/195 |
| 2005/0170098 A1 | 8/2005 | Baumann et al. | |
| 2005/0170126 A1 | 8/2005 | Kawabata | |
| 2005/0227006 A1 | 10/2005 | Segall | |

* cited by examiner

*Primary Examiner* — Betelhem Shewareged
(74) *Attorney, Agent, or Firm* — Rankin, Hill & Clark LLP

(57) ABSTRACT

The invention relates to a radiation-curable printing medium based on a thermoplastic polymer and at least one radiation-curable monomeric compound. By means of a compound which comprises a heterocyclic ring, it is possible to achieve a favorable combination of properties comprising reactivity and flexibility of the decoration. Preferred monomeric compounds contain a 1,3-dioxolane or 1,3- or 1,4-dioxane ring, and an acrylic or methacrylic group is attached in the manner of an ester around a methylol group.

The invention also provides transfers containing the printing medium and decorative preparations.

39 Claims, No Drawings

RADIATION CURABLE PRINTING MEDIA, TRANSFERS PRODUCED THEREWITH AND PROCESS FOR THE PRODUCTION OF CERAMIC DECORATION

The invention relates to novel radiation-curable printing media which contain a polymeric, plastic binder, at least one radiation-curable monomeric compound and are distinguished by improved flexibility. The invention furthermore relates to transfers which have been produced using a radiation-curable printing medium according to the invention, and to a process for the production of ceramic decoration, wherein a decorative preparation which contains a printing medium according to the invention is applied onto the ceramic substrate to be decorated, is cured by means of radiation and is then fired under conventional conditions.

Various direct or indirect printing processes, the latter also including the transfer method, are known for producing ceramic decoration. Decoration is accordingly carried out by printing a decorative preparation, which conventionally contains a decoration-forming component, for example a pigment, a pigment mixture, a pigment precursor, a noble metal compound or metallic powder, together with a liquid or pasty printing medium, onto the substrate or a transfer support. In the case of a radiation-curing printing medium, application of the decorative layer is followed by curing by means of a radiation source, in particular a UV source. Finally, the decorative layer applied onto the substrate is stoved in a manner known per se.

The use of radiation-curable printing media is becoming increasingly significant because it is possible using this method to reduce or avoid the environmental problems which may arise from the vaporisation of solvents during the decoration process. Hitherto known radiation-curable printing media which are suitable for the production of transfers often exhibit the disadvantage of inadequate flexibility and/or inadequate reactivity. While elevated reactivity of a printing medium does indeed lead to rapid curing by means of for example UV radiation to give rise to a tack-free surface, more extended periods of storage of the transfers containing such a radiation-curing printing medium result in embrittlement of the transfers, so giving rise to breakages on application and thus defects in the decoration. On the other hand, however, radiation-curable printing media which have enduring flexibility thanks to having a composition with an elevated content of flexibilising monomers give rise to decoration with excessive surface tackiness under conventional radiation curing conditions; such transfers are unusable because they cannot be overprinted or stacked. While radiation-curable printing media of the most varied compositions are known, they leave something to be desired with regard to one or the other of the requirements or combinations of requirements placed upon them.

German patent DE 30 48 823 teaches a resin composition curable with UV radiation which consists of a specific saturated copolyester, a polymerisable component comprising a compound with one polymerisable double bond per molecule and a compound with two or more polymerisable double bonds per molecule and at least one photosensitiser; the resin composition may additionally contain other synthetic resins, such as organic isocyanate compounds, pigments, flow auxiliaries and thermal polymerisation inhibitors. The polymerisable component preferably comprises 10 to 70 wt. % of a monoacrylate and/or monomethacrylate, 5 to 50 wt. % of one or more acrylates or methacrylates with at least two polymerisable double bonds and 20 to 70 wt. % of one or more diacrylates or dimethacrylates with a molecular weight of greater than 500. These systems contain one or more compounds from the range of benzoins, anthraquinones, benzophenones, xanthones and thioxanthones as photoinitiators.

Tetrahydrofurfuryl acrylate, namely an acrylate whose alcohol component contains a heterocyclic ring, is used as a monofunctional acrylate in the above-mentioned DE 30 48 823. No indication can be inferred from this document, however, that specific advantages could be obtained by using heterocyclic acrylates.

German patent DE 38 19 414 discloses bright noble metal preparations for decorating glass, ceramics and porcelain, which preparations contain a soluble organic noble metal compound, a polycyclic acrylate, such as isobornyl acrylate and/or dicyclopentadienyl acrylate, and a photoinitiator. These preparations may additionally contain other polymerisable compounds, including N-vinylpyrrolidone. Further constituents of the medium containing a soluble organic noble metal compound are oligomers with acrylate and/or methacrylate groups.

Japanese published patent application JP 141473 (1984) also relates to noble metal decoration on ceramic products, wherein both the medium of the image layer as well as the cover layer contain radiation-curable components.

In an attempt to overcome the disadvantages of radiation-curing media, EP 52 763 and 52 764 A1 propose using such printing media which contain prepolymers of polyfunctional acrylate resins, such as acrylated polyesters, mono-, di- and trifunctional acrylates, polymethyl methacrylates with a defined degree of polymerisation and a photoinitiator. According to EP 0 106 628 A1, further improved radiation-curing printing media may be obtained by these media substantially consisting of a completely polymerised thermoplastic resin and a radiation-curing diluent, and polyfunctional acrylate resins or acrylated polyesters may be omitted without disadvantage for the firing characteristics.

According to U.S. Pat. No. 4,666,756, transfers which were produced using a radiation-curable printing medium and which exhibit improved flexibility may be obtained by the printing medium to be used in the production of the transfer containing a diacrylate or dimethacrylate of an oligoalkylene glycol. The reactivity of such systems is, however, often inadequate, such that decorative films produced therewith either entail an excessively long curing time and/or remain tacky.

The object of the present invention is accordingly to provide further radiation-curable printing media with an improved range of properties.

A further object is to achieve a combination of reactivity and flexibility which is such that transfers produced therewith exhibit sufficient flexibility, even after extended storage, for defect-free decoration to be obtainable.

A further object of the invention is to provide transfers which cure tack-free under conventional radiation curing conditions and may thus be overprinted and stacked. The above-stated objects, together with further objects which emerge from the following description, are achieved by the radiation-curable printing medium according to the claims.

The invention accordingly provides a radiation-curable printing medium for the production of ceramic decoration, comprising a polymeric thermoplastic binder and at least one radiation-curable monomeric compound from the range of olefinic compounds containing a heterocyclic ring, the polymeric binder being soluble in the monomeric compound, characterised in that the heterocyclic ring contains 4 to 8 ring members and one or more nitrogen and/or oxygen atoms as heteroatom, at least one radiation-polymerisable vinyl, acrylic or methacrylic group is attached to the heterocyclic ring directly or via a one- to six-membered bridging member, a carbon atom adjacent to a ring heteroatom comprises at least one abstractable hydrogen atom, and N-vinylpyrrolidone and tetrahydrofurfuryl (meth)acrylate are excluded as a polymerisable monomeric compound.

The subordinate claims relate to preferred embodiments of the printing medium according to the invention.

Further claims relate to a transfer using a printing medium according to the invention and to a process for the production of ceramic decoration using a printing medium according to the invention.

It is an essential feature of the invention that the radiation-curable printing medium contains at least one radiation-curable monomeric compound which comprises a heterocyclic ring and at least one abstractable hydrogen atom on a carbon atom adjacent to the heteroatom. With regard to the prior art acknowledged above, the generic polymerisable monomeric compounds N-vinylpyrrolidone and tetrahydrofurfuryl (meth)acrylate are excepted.

The heterocyclic ring of the polymerisable monomeric compound may contain one or more heteroatoms selected from among nitrogen and/or oxygen. They particularly preferably comprise compounds with one or two oxygen atoms, one or two nitrogen atoms or one oxygen and one nitrogen atom. The heterocyclic ring may be saturated or partially unsaturated, but not however heteroaromatic, because in the latter case no carbon atom adjacent to the heteroatom can comprise an abstractable hydrogen atom. On condition that a carbon atom adjacent to a heteroatom contains at least one abstractable hydrogen atom and a substituent with a radiation-polymerisable vinyl, acrylic or methacrylic group is attached to a further atom, the heterocyclic ring may contain further substituents, in particular alkyl groups with 1 to 12 C atoms, such as particularly preferably methylethyl, n-propyl and isopropyl, alkoxy groups such as methoxy, ethoxy, methoxyethoxy, and alkoxy groups which contain more than one ether bridge, nitrile, ethoxycarbonyl and carbameth groups.

Preferred polymerisable monomeric compounds contain a heterocyclic ring, selected from the range of
(i) dihydro- and tetrahydro-2H-pyran, 1,3-dioxolane, 1,3- and 1,4-dioxane, benzo- and isobenzodihydrofuran, 2H-chromene, 1H-isochromene, chroman and isochroman, 3-benzoxepine,
(ii) pyrroline and pyrrolidine, imidazoline and imidazolidine, piperidine, indoline and isoindoline, 1,2-dihydro- and tetrahydro-quinoline and -isoquinoline, piperazine, perhydropyrimidine, and
(iii) morphiline, perhydro-1,3-oxazine, 4H-dihydro-3,1-benzoxazine, 1,3-oxazoline, 1,3-oxazolidine.

According to a further embodiment, the heterocyclic ring of the monomeric polymerisable compound comprises a five- to seven-membered lactam ring, in particular the valerolactone and caprolactam ring, furthermore also the hydantoin ring. The polymerisable group is conveniently attached to the lactam nitrogen directly or via a bridging member containing 1 to 4 C atoms. The polymerisable groups may here preferably comprise a group from the range of vinyl, acrylic, methacrylic, (meth)acryloyl-oxy-($C_1$-$C_4$)-alkyl or (meth)acryloylamino-($C_1$-$C_4$)-alkyl substituents. The term (meth)acrylic in each case denotes alternatively acrylic or methacrylic.

According to a further preferred embodiment, the heterocyclic ring comprises a 1,3-dioxolane, 1,3- or 1,4-dioxane ring. Particularly preferred polymerisable compounds with a heterocyclic ring are trimethylolethane monoformal and trimethylolpropane monoformal, mono(meth)acrylic acid esters.

Further particularly preferred polymerisable compounds are valerolactam, caprolactam and hydantoin and optionally methyl-substituted derivatives which contain the polymerisable group attached directly to the lactam nitrogen.

The thermoplastic polymeric binder may comprise various classes of materials, including polymers and copolymers, polycondensation products and polyaddition resins. The degree of polymerisation or polycondensation of these binders is selected such that sufficient compatibility is ensured with the monomeric compound with the heterocyclic ring. Binders which are preferably considered are polymers and/or copolymers of acrylates and methacrylates of the general formula $$CH_2=CR^1-COOR^2,$$

in which $R^1$ denotes H or $CH_3$ and $R^2$ denotes H, alkyl, cycloalkyl, aralkyl or aryl with a total of 1 to 20 C atoms. Methyl (meth)acrylate, ethyl (meth)acrylate, n-propyl (meth)acrylate, isopropyl (meth)acrylate, n-butyl (meth)acrylate, cyclohexyl (meth)acrylate, benzyl (meth)acrylate and phenyl (meth)acrylate may be stated by way of example. Copolymers of methyl (meth)acrylate and n-butyl (meth)acrylate are particularly preferred. The polymeric binder may additionally also contain other polymerisable compounds, such as ethylene, styrene, butadiene, isobutylene, isoprene, vinyl acetate, isobutyl, isobutyl vinyl ether and acrylonitrile.

As an alternative to these binders obtained by polymerisation of one or more polymerisable monomeric compounds, other compatible resins, such as polyester resins and isocyanate resins, may be used alone or in combination with the above-stated polymers, provided that these exhibit sufficient compatibility with one another.

The thermoplastic polymeric binder and the radiation-polymerisable monomeric heterocyclic compound may be present in the printing medium in a ratio by weight of greater than or equal to 1:20, in particular 1:10 to 1:2.

The range of properties of the printing medium may be controlled by the quantity ratio of these two most important components. Other radiation-polymerisable monomers having one or more, in particular one or two polymerisable vinyl, acrylic or methacrylic groups may additionally be a constituent of the printing medium in order to modify the properties thereof. Examples of such polymerisable compounds are styrene derivatives, such as methylstyrene and chlorostyrene, alkyl (meth)acrylates, such as methyl methacrylate, ethyl (meth)acrylate, n-i-propyl (meth)acrylate, lauryl (meth)acrylate, stearyl (meth)acrylate, 2-hydroxyethyl acrylate, polyoxyalkylene glycol mono(meth)acrylates, such as polyethylene glycol mono(meth)acrylate and polypropylene glycol mono(meth)acrylate, and tetrahydrofurfuryl (meth)acrylate.

The properties of the printing medium may additionally also be modified by using photopolymerisable compounds with two or more polymerisable double bonds, such as ethylene glycol di(meth)acrylate, propylene glycol di(meth)acrylate, 1,4-butanediol di(meth)acrylate, di- or triethylene glycol di(meth)acrylate, trimethylolpropane tri(meth)acrylate and pentaerythritol tetra(meth)acrylate. The printing medium may be further modified by additionally also containing defoamers, plasticisers, thixotroping agents and further known additives.

The quantity ratios of the components contained in the printing medium may vary within broad limits. Preferred printing media contain at least 2 wt. %, in particular 5 to 40 wt. %, of thermoplastic binder, which may consist of one or more components and is in particular a methacrylate polymer or methacrylate copolymer, 5 to 95 wt. %, in particular 10 to 90 wt. %, of one or more polymerisable monomers with a heterocyclic ring and 0 to 85 wt. %, in particular 0 to 70 wt. %, of other radiation-polymerisable monomers. In addition to the above-stated polymers and polymerisable monomers, the printing medium contains an effective quantity of one or more photoinitiators. Examples of photoinitiators are ketals, such as benzyl dimethyl ketal; benzoins, such as benzoin methyl ether, benzoin ethyl ether; anthraquinones, such as 1-chloroanthraquinone and 2-ethylanthraquinone; benzophenols, such as benzophenone, p-dimethylaminobenzophenone; propiophenones, such as 2-hydroxy-2-methylpropiophenone; dibenzosuberone; sulfur-containing compounds, such as dimethyl disulfide, tetramethylthiuram disulfide, and thioxanthone.

The above-stated additives are used in an effective quantity, conventionally in a quantity of less than 15 wt. %, in particular of less than 10 wt. %.

The invention also provides radiation-curable decorative preparations, which [comprise] a printing medium according to the invention and a decorative component from the range of pigments, metal powders, pigment precursors, noble metal compounds, which are suspended and/or dissolved in the printing medium, and, if necessary, additionally particulate agents to increase the pigment volume concentration (PVC).

Selection of the decoration-bound components is known to the person skilled in the art and is determined by the desired effects, such as colour, gloss and abrasion characteristics and resistance to acids and bases. The same applies to the quantity of decoration-bound components used. One further component contained in decorative preparations for ceramic decoration comprises fluxes, which usually comprise a combination of substances from the range of glass frits, precursors of glass-forming oxides and silicates. The oxides may also comprise coupling oxides, which effect good adhesion of the decorative layer to the ceramic substrate, such as glass and ceramics, on firing of the decoration.

Radiation-curable noble metal preparations contain, for example, 10 to 50 wt. %, in particular 30 to 45 wt. %, of gold in elemental form, 0.1 to 20 wt. %, in particular 1 to 5 wt. %, of flux and 30 to 80 wt. % of a printing medium according to the invention. If necessary, soluble noble metal compounds may additionally be present. In order to obtain aesthetically attractive decoration with good surface quality by means of direct and indirect printing processes with such preparations, it is convenient, instead of using silicone-based flow auxiliaries, to use agents to increase the pigment volume concentration. The latter comprise particulate organic compounds, such as uncrosslinked or crosslinked organic polymers, which are insoluble and non-swellable in the printing medium but combust completely on firing of the decoration (see EP-A 01 121 227).

Decorative preparations which contain inorganic pigments and glass frits as the flux may substantially contain 1 to 50 wt. % of inorganic pigments, 1 to 50 wt. % of glass frits and 10 to 90 wt. %, in particular 20 to 40 wt. %, of printing medium according to the invention.

The invention also provides transfers for the production of ceramic decoration comprising a flexible support material, such as transfer paper, a release layer activatable by water or heat, an image layer thereon and a cover layer thereover. According to the invention, the image layer and/or the cover layer contain a radiation-curable printing medium according to a claim relating thereto.

The transfer method is a well known and widely used process for decorating ceramic substrates. The image and decorative layer located on the transfer support, with further layers such as a coupling layer and special effect-imparting layers being present if necessary, are slid onto the substrate to be decorated, and the decoration is then stoved.

A ceramic decoration is produced by applying a radiation-curable, pasty decorative preparation, the latter containing a printing medium according to the invention, onto the substrate to be decorated by a direct or indirect printing process, in particular a screen printing process. The decorative layer is cured by irradiation of the decorative layer with UV light or another kind of high-energy radiation. The decoration applied onto the ceramic substrate, which also includes glass, is then stoved under decoration firing conditions adjusted to the substrate and the composition of the decorative preparation.

The printing medium according to the invention is distinguished by good radiation curing properties and exhibits the required combination of properties with regard to elevated reactivity and thus rapid curing and absence of tack of the decorative layer and elevated flexibility of the decorative layer allowing defect-free decoration with sharp outlines to be obtained. One particular advantage of the printing medium is that transfers produced therewith retain their flexibility even after an extended period of storage and the feared embrittlement and thus breakage of the decoration do not occur. This combination of properties cannot be achieved by prior art printing media containing a mixture of reactive difunctional and flexibilising monofunctional monomers.

EXAMPLES

The UV media from Example 1 and Comparative Example 2 are used to prepare a paste of ceramic colours in a ratio of 10 parts by weight of colour to 7-9 parts by weight of medium. Paste preparation ratios of 10:2 to 10:20 may be achieved by controlling the viscosity of the medium (content of methacrylate polymer).

Transfers are obtained by screen printing onto suitable transfer paper (for example Meta Consort, Hoffmann & Engelmann) and subsequent curing with a UV lamp. A UV dose of 200-600 mJ/cm$^2$ should be provided here (depending on the colour) and the UV print should be overcoated with a UV-curing clear coat serving as a transfer lacquer (e.g. 80450, Ferro).

Reference should be made to A. Huber, "Decoration of porcelain, earthenware & bone china", CFI, Jan. 1996 with regard to the general procedure for producing transfer images in ceramic decoration.

The following Table shows the composition of a medium according to the invention and some prior art media.

TABLE 1

| Example 1 (B1) | | |
|---|---|---|
| Heterocyclic monomer, monofunctional | trimethylolpropane formal acrylate | 60% |
| MMA/n-BuMA copolymer | Degalan P24 | 22% |
| Glycerol fatty acid ester (thixotroping agent) | Thixatrol ST | 2% |
| Phthalate plasticiser | Edenol 344 | 6% |
| Photoinitiator | Darocure 1173 | 5% |
| Synergist | Quantacure EPD | 2% |
| Photoinitiator | Quantacure ITX | 3% |
| Comparative Example 1 (VB1) | | |
| Linear monomer, monofunctional | diethylene glycol ethyl ether acrylate | 30% |
| Linear monomer, difunctional | dipropylene glycol diacrylate | 30% |
| MMA/n-BuMA copolymer | Degalan P24 | 22% |
| Glycerol fatty acid ester (thixotroping agent) | Thixatrol ST | 2% |
| Phthalate plasticiser | Edenol 344 | 6% |

TABLE 1-continued

| | | |
|---|---|---|
| Photoinitiator | Darocure 1173 | 5% |
| Synergist | Quantacure EPD | 2% |
| Photoinitiator | Quantacure ITX | 3% |
| Comparative Example 2 (VB2) | | |
| Linear monomer, monofunctional | diethylene glycol ethyl ether acrylate | 60% |
| MMA/n-BuMA copolymer | Degalan P24 | 22% |
| Glycerol fatty acid ester (thixotroping agent) | Thixatrol ST | 2% |
| Phthalate plasticiser | Edenol 344 | 6% |
| Photoinitiator | Darocure 1173 | 5% |
| Synergist | Quantacure EPD | 2% |
| Photoinitiator | Quantacure ITX | 3% |
| Comparative Example 3 (VB3) | | |
| Linear monomer, difunctional | dipropylene glycol diacrylate | 60% |
| MMA/n-BuMA copolymer | Degalan P24 | 22% |
| Glycerol fatty acid ester (thixotroping agent) | Thixatrol ST | 2% |
| Phthalate plasticiser | Edenol 344 | 6% |
| Photoinitiator | Darocure 1173 | 5% |
| Synergist | Quantacure EPD | 2% |
| Photoinitiator | Quantacure ITX | 3% |

The properties of the transfers produced using the media according to Table 1 are shown in Table 2 below.

TABLE 2

| Medium no. | Age of transfer | Reactivity (curing) | Flexibility/decoration quality |
|---|---|---|---|
| B1 | 6 h | good | good/good |
| | 5 days | good | good/good |
| | 1 month | good | good/good |
| VB1 | 6 h | good | good/good |
| | 5 days | good | moderate/outlines watery |
| | 1 month | good | brittle/severe decoration defects |
| VB2 | 6 h | very good | good |
| | 5 days | reduced by crosslinking | complete embrittlement/ decoration breaks up on application |
| VB3 | 6 h | inadequate curing, tacky surface | good |
| | 5 days | reduced adhesiveness | good |

The invention claimed is:

1. A transfer comprising:
a flexible support material;
a release layer;
an image layer on the release layer; and
a cover layer;
wherein at least one of the image layer and the cover layer include a radiation-curable printing medium for the production of ceramic decoration comprising a polymeric thermoplastic binder and at least one radiation-polymerisable monomeric olefinic compound, the polymeric binder being soluble in the monomeric compound, the monomeric compound containing a heterocyclic ring and a substituent group attached to the heterocyclic ring directly or via a one- to six-membered bridging member, a carbon atom adjacent to a ring heteroatom comprises at least one abstractable hydrogen atom, wherein the heterocyclic ring is selected from the group consisting of (i) 1,3-dioxolane, (ii) 1,3-dioxane, and (iii) 1,4-dioxane, and the substituent is selected from the group consisting of (i) (meth)acryloyl-oxy-($C_1$-$C_4$) alkyl substituent or (ii) (meth)acryloylamino-($C_1$-$C_4$) alkyl substituent.

2. The transfer according to claim 1 characterised in that the thermoplastic polymeric binder and the radiation-polymerisable heterocyclic monomeric compound are present in a ratio by weight of at least 1 part thermoplastic polymeric binder or more to 20 parts of radiation-polymerisable heterocyclic monomeric compound.

3. The transfer according to claim 1 characterised in that the printing medium additionally contains other radiation-polymerisable monomers.

4. The transfer according to claim 1 characterised in that the printing medium contains at least 2 wt. % of thermoplastic binder, 5 to 95 wt. % of polymerisable monomers with a heterocyclic ring and 0 to 85 wt. % of other radiation-polymerisable monomers.

5. The transfer according to claim 1 characterised in that the printing medium contains 1 to 20 wt. % of photoinitiator.

6. The transfer according to claim 1 characterised in that the printing medium additionally contains one or more additives selected from the group consisting of defoamers, phthalate plasticisers and thixotroping agents in a total quantity of up to 15 wt. %.

7. The transfer according to claim 2 wherein the ratio of the thermoplastic polymeric binder and the radiation-polymerisable heterocyclic monomeric compound is from 1:10, respectively to 1:2, respectively.

8. The transfer of claim 1 wherein the polymerisable monomeric compound comprises trimethylolethane or trimethylolpropane monoformal mono(meth)acrylic acid esters.

9. The transfer of claim 3 wherein the other radiation-polymerisable monomers are those with one or two polymerisable vinyl, acrylic or methacrylic groups, in an amount of up to 85 weight percent.

10. The transfer of claim 4 wherein the printing medium contains 5 to 40 weight percent of thermoplastic binder.

11. The transfer of claim 4 wherein the thermoplastic binder is a methacrylate polymer or copolymer.

12. The transfer of claim 4 wherein the printing medium contains 10 to 90 weight percent of polymerisable monomers with a heterocyclic ring.

13. The transfer of claim 4 wherein the printing medium contains 0 to 70 weight percent of the other radiation-polymerisable monomers.

14. A transfer comprising:
a flexible support material;
a release layer;
an image layer on the release layer; and
a cover layer;
wherein at least one of the image layer and the cover layer include a radiation-curable decorative preparation comprising a printing medium and a decorative component selected from the group consisting of pigments, metal powders, pigment precursors, and noble metal compounds, the decorative component suspended and/or dissolved in the printing medium, and, if necessary, additionally particulate agents to increase the pigment volume concentration (PVC), characterised in that the radiation curable decorative preparation contains a printing medium comprising a polymeric thermoplastic binder and at least one radiation-curable monomeric compound, the polymeric binder being soluble in the monomeric compound, the monomeric compound containing a heterocyclic ring and a substituent group attached to the heterocyclic ring directly or via a one- to six-membered bridging member, a carbon atom adjacent to a ring heteroatom comprises at least one abstractable hydrogen atom, wherein the heterocyclic ring is selected from the group consisting of (i) 1,3-dioxolane, (ii) 1,3- dioxane, and (iii) 1,4-dioxane, and the substituent is selected from the group consisting of (i) (meth)acryloyl-oxy-($C_1$-$C_4$) alkyl substituent or (ii) (meth)acryloylamino-($C_1$-$C_4$) alkyl substituent.

15. The transfer according to claim 14 characterised in that the thermoplastic polymeric binder and the radiation-curable heterocyclic monomeric compound are present in a ratio by weight of at least 1 part thermoplastic polymeric binder or more to 20 parts of radiation-curable heterocyclic monomeric compound.

16. The transfer according to claim 14 characterised in that the printing medium additionally contains other radiation-curable monomers.

17. The transfer according to claim 14 characterised in that the printing medium contains at least 2 wt. % of thermoplastic binder, 5 to 95 wt. % of polymerisable monomers with a heterocyclic ring and 0 to 85 wt. % of other radiation-curable monomers.

18. The transfer according to claim 14 characterised in that the printing medium contains 1 to 20 wt. % of photoinitiator.

19. The transfer according to claim 14 characterised in that the printing medium additionally contains one or more additives selected from the group consisting of defoamers, phthalate plasticisers and thixotroping agents in a total quantity of up to 15 wt. %.

20. The transfer according to claim 15 wherein the ratio of the thermoplastic polymeric binder and the radiation-curable heterocyclic monomeric compound is from 1:10, respectively to 1:2, respectively.

21. The transfer of claim 14 wherein the radiation-curable monomeric compound comprises trimethylolethane or trimethylolpropane monoformal mono(meth)acrylic acid esters.

22. The transfer of claim 16 wherein the other radiation-curable monomers are those with one or two polymerisable vinyl, acrylic or methacrylic groups, in an amount of up to 85 weight percent.

23. The transfer of claim 17 wherein the printing medium contains 5 to 40 weight percent of thermoplastic binder.

24. The transfer of claim 17 wherein the thermoplastic binder is a methacrylate polymer or copolymer.

25. The transfer of claim 17 wherein the printing medium contains 10 to 90 weight percent of polymerisable monomers with a heterocyclic ring.

26. The transfer of claim 17 wherein the printing medium contains 0 to 70 weight percent of the other radiation-curable monomers.

27. A transfer for the production of ceramic decoration comprising a flexible support material, a release layer activatable by water or heat, an image layer thereon and a cover layer thereover, characterised in that the image layer and/or the cover layer has/have been produced using a radiation-curable printing medium comprising a polymeric thermoplastic binder and at least one radiation-curable monomeric compound from the range of olefinic compounds containing a heterocyclic ring, the polymeric binder being soluble in the monomeric compound, the monomeric compound containing a heterocyclic ring and a substituent group attached to the heterocyclic ring directly or via a one- to six-membered bridging member, a carbon atom adjacent to a ring heteroatom comprises at least one abstractable hydrogen atom wherein the heterocyclic ring is selected from the group consisting of (i) 1,3-dioxolane, (ii) 1,3-dioxane, and (iii) 1,4-dioxane, and the substituent is selected from the group consisting of (i) (meth)acryloyl-oxy-($C_1$-$C_4$) alkyl substituent or (ii) (meth)acryloylamino-($C_1$-$C_4$) alkyl substituent.

28. The transfer according to claim 27 characterised in that the thermoplastic polymeric binder and the radiation-curable heterocyclic monomeric compound are present in a ratio by weight of at least 1 part thermoplastic polymeric binder or more to 20 parts of radiation-polymerisable heterocyclic monomeric compound.

29. The transfer according to claim 27 characterised in that the printing medium additionally contains other radiation-curable monomers.

30. The transfer according to claim 27 characterised in that the printing medium contains at least 2 wt. % of thermoplastic binder, 5 to 95 wt. % of polymerisable monomers with a heterocyclic ring and 0 to 85 wt. % of other radiation-curable monomers.

31. The transfer according to claim 27 characterised in that the printing medium contains 1 to 20 wt. % of photoinitiator.

32. The transfer according to claim 27 characterised in that the printing medium additionally contains one or more additives selected from the group consisting of defoamers, phthalate plasticisers and thixotroping agents in a total quantity of up to 15 wt. %.

33. The transfer according to claim 28 wherein the ratio of the thermoplastic polymeric binder and the radiation-curable heterocyclic monomeric compound is from 1:10, respectively to 1:2, respectively.

34. The transfer of claim 27 wherein the radiation-curable monomeric compound comprises trimethylolethane or trimethylolpropane monoformal mono(meth)acrylic acid esters.

35. The transfer of claim 29 wherein the other radiation-curable monomers are those with one or two polymerisable vinyl, acrylic or methacrylic groups, in an amount of up to 85 weight percent.

36. The transfer of claim 30 wherein the printing medium contains 5 to 40 weight percent of thermoplastic binder.

37. The transfer of claim 30 wherein the thermoplastic binder is a methacrylate polymer or copolymer.

38. The transfer of claim 30 wherein the printing medium contains 10 to 90 weight percent of polymerisable monomers with a heterocyclic ring.

39. The transfer of claim 30 wherein the printing medium contains 0 to 70 weight percent of the other radiation-curable monomers.

* * * * *